US012266114B2

(12) United States Patent
Zhang et al.

(10) Patent No.: US 12,266,114 B2
(45) Date of Patent: Apr. 1, 2025

(54) IMAGE PROCESSING METHOD AND APPARATUS, DEVICE AND STORAGE MEDIUM

(71) Applicant: TENCENT TECHNOLOGY (SHENZHEN) COMPANY LIMITED, Guangdong (CN)

(72) Inventors: Rui Zhang, Shenzhen (CN); Pei Cheng, Shenzhen (CN); Gang Yu, Shenzhen (CN); Bin Fu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 368 days.

(21) Appl. No.: 17/887,994

(22) Filed: Aug. 15, 2022

(65) Prior Publication Data

US 2022/0398742 A1 Dec. 15, 2022

Related U.S. Application Data

(63) Continuation of application No. PCT/CN2021/104481, filed on Jul. 5, 2021.

(30) Foreign Application Priority Data

Jul. 23, 2020 (CN) .......................... 202010718692.9

(51) Int. Cl.
*G06T 7/194* (2017.01)
*G06T 7/11* (2017.01)
(Continued)

(52) U.S. Cl.
CPC .............. *G06T 7/194* (2017.01); *G06T 7/11* (2017.01); *G06V 10/22* (2022.01); *G06V 10/267* (2022.01);
(Continued)

(58) Field of Classification Search
None
See application file for complete search history.

(56) References Cited

U.S. PATENT DOCUMENTS 8,897,562 B2 * 11/2014 Bai .................... G06T 7/269
382/173
2011/0038536 A1 * 2/2011 Gong ................... G06T 7/11
382/164
(Continued)

FOREIGN PATENT DOCUMENTS

CN 109934812 A 6/2019
CN 110956654 A 4/2020
(Continued)

OTHER PUBLICATIONS

A Late Fusion CNN for Digital Matting. Zhang et al. (Year: 2019).*
(Continued)

*Primary Examiner* — Delomia L Gilliard
(74) *Attorney, Agent, or Firm* — Sughrue Mion, PLLC

(57) ABSTRACT

An image processing method and apparatus, a device, and a storage medium. The image processing method includes: performing preliminary segmentation recognition on a raw image by using a first segmentation model to obtain a candidate foreground image region and a candidate background image region of the raw image; recombining the candidate foreground image region, the candidate background image region, and the raw image to obtain a recombined image, pixels in the recombined image being in a one-to-one correspondence with pixels in the raw image; and performing region segmentation recognition on the recombined image by using a second segmentation model to obtain a target foreground image region and a target background image region of the raw image.

18 Claims, 9 Drawing Sheets

(51) Int. Cl.
  *G06V 10/22* (2022.01)
  *G06V 10/26* (2022.01)
  *G06V 10/40* (2022.01)
  *G06V 10/776* (2022.01)

(52) U.S. Cl.
  CPC ............ *G06V 10/40* (2022.01); *G06V 10/776* (2022.01); *G06T 2207/20076* (2013.01); *G06T 2207/20081* (2013.01); *G06T 2207/20084* (2013.01); *G06T 2207/20221* (2013.01)

(56) References Cited

U.S. PATENT DOCUMENTS

| | | | | |
|---|---|---|---|---|
| 2011/0274344 | A1* | 11/2011 | Lee | G06T 7/194 |
| | | | | 382/155 |
| 2016/0057363 | A1* | 2/2016 | Posa | H04N 1/2125 |
| | | | | 348/239 |
| 2016/0104291 | A1* | 4/2016 | Zhou | G06T 7/194 |
| | | | | 382/173 |
| 2018/0308267 | A1* | 10/2018 | Ray | G06T 11/60 |
| 2020/0175352 | A1* | 6/2020 | Cha | G06N 3/04 |
| 2021/0390704 | A1* | 12/2021 | Fujimoto | G06V 10/82 |
| 2022/0051404 | A1* | 2/2022 | Zhang | G06T 7/136 |

FOREIGN PATENT DOCUMENTS

| | | |
|---|---|---|
| CN | 111127486 A | 5/2020 |
| CN | 111768425 A | 10/2020 |

OTHER PUBLICATIONS

International Search Report for PCT/CN2021/104481 dated Sep. 29, 2021 [PCT/ISA/210].
Korea Office Action for 2020107186929 dated May 24, 2021.
Yunke Zhang, et al., "A Late Fusion CNN for Digital Matting", IEEE Conference on Computer Vision and Pattern Recognition (CVPR), 2019, pp. 7461-7470 (10 pages).
Extended European Search Report dated Aug. 1, 2023 in Application No. 21846696.9.
Written Opinion dated Sep. 29, 2021, issued in International Application No. PCT/CN2021/104481.

* cited by examiner

IMAGE PROCESSING METHOD AND APPARATUS, DEVICE AND STORAGE MEDIUM

CROSS-REFERENCE TO RELATED APPLICATION(S)

This application is a continuation application of International Application No. PCT/CN2021/104481, filed Jul. 5, 2021, which claims priority to Chinese Patent Application No. 202010718692.9, filed with the China National Intellectual Property Administration on Jul. 23, 2020, the disclosures of which are incorporated by reference in their entireties.

FIELD

The present disclosure relates to the field of computer vision related technologies in artificial intelligence (AI), and in particular, to an image processing method and apparatus, a device, and a storage medium.

BACKGROUND

AI is a comprehensive technology of computer science, and through study of design principles and implementation methods of various intelligent machines, enables the machines to have functions of perception, reasoning, and decision-making. The AI technology is a comprehensive discipline, involving a wide range of fields, such as computer vision technology, natural language processing technology, machine learning/deep learning, and other major fields. With the development of technologies, the AI technology is to be applied in more fields and play an increasingly important role.

In an AI-based computer vision technology, image segmentation is an important research field, and a foreground image region and a background image region can be obtained through segmentation from a raw image, so that corresponding processing, such as face recognition, replacement of a background image region, and addition of an image effect, can be performed on the foreground image region or the background image region.

SUMMARY

According to various embodiments provided in the disclosure, an image processing method and apparatus, a device, and a storage medium are provided.

The present disclosure may provide an image processing method, performed by a computer device, including: performing preliminary segmentation recognition on a raw image by using a first segmentation model to obtain a candidate foreground image region and a candidate background image region of the raw image; recombining the candidate foreground image region, the candidate background image region, and the raw image to obtain a recombined image; pixels in the recombined image being in a one-to-one correspondence with pixels in the raw image; and performing region segmentation recognition on the recombined image by using a second segmentation model to obtain a target foreground image region and a target background image region of the raw image.

Some embodiments may further provide an image processing apparatus, including: a recognition module, configured to perform preliminary segmentation recognition on a raw image by using a first segmentation model to obtain a candidate foreground image region and a candidate background image region of the raw image; and a recombination module, configured to recombine the candidate foreground image region, the candidate background image region, and the raw image to obtain a recombined image; pixels in the recombined image being in a one-to-one correspondence with pixels in the raw image; and the recognition module being further configured to perform region segmentation recognition on the recombined image by using a second segmentation model to obtain a target foreground image region and a target background image region of the raw image.

Some embodiments may further provide a computer device, including a processor and a memory; the memory being configured to store a computer program, and the processor being configured to call the computer program to perform operations of the image processing method according to the embodiments of the disclosure.

Some embodiments may further provide a non-transitory computer-readable storage medium, the computer-readable storage medium storing a computer program, the computer program including program instructions, and the program instructions, when executed by one or more processors, causing the one or more processor performing operations of the image processing method according to the embodiments of the disclosure.

BRIEF DESCRIPTION OF THE DRAWINGS

To describe the technical solutions of example embodiments of this disclosure more clearly, the following briefly introduces the accompanying drawings for describing the example embodiments. The accompanying drawings in the following description show only some embodiments of the disclosure, and a person of ordinary skill in the art may still derive other drawings from these accompanying drawings without creative efforts. In addition, one of ordinary skill would understand that aspects of example embodiments may be combined together or implemented alone.

DESCRIPTION OF EMBODIMENTS

To make objects, technical solutions, and advantages of the present disclosure clearer, the following further describes the present disclosure in detail with reference to the accompanying drawings in the embodiments the disclosure. The described embodiments are merely some embodiments of the disclosure rather than all of the embodiments. All other embodiments obtained by a person of ordinary skill in the art based on the embodiments of the disclosure without creative efforts shall fall within the protection scope of the disclosure.

Figure 1:
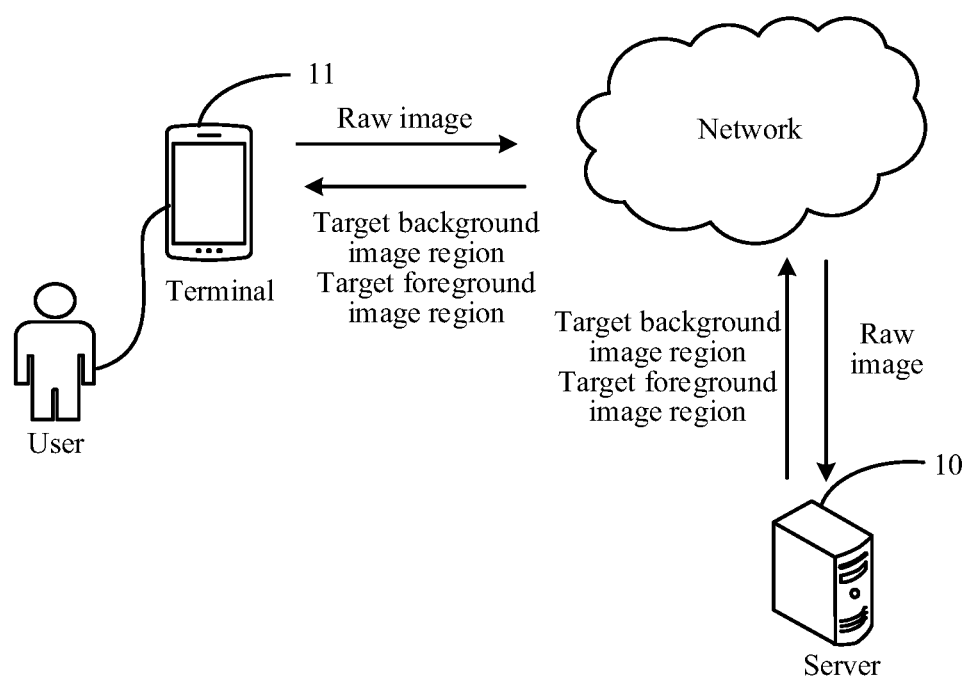
FIG. 1 is a schematic architectural diagram of an image processing system according to some embodiments of the disclosure.

An image processing method provided in the embodiments of the disclosure relates to computer vision technologies in AI, and in particular, to an image segment technology in the computer vision technologies. First, an image processing system for implementing the image processing method is described. As shown in FIG. 1, the image processing system includes a server 10 and at least one terminal 11.

The terminal 11 may be a user-oriented terminal, that is, the terminal 11 may be a terminal used by a user to obtain a raw image and send the image to the server 10. The raw image may be an image on which image segmentation needs to be performed. The raw image may be captured by the terminal 11, or the raw image may be downloaded by the terminal 11 from a network. The server 10 may be a back end service device for image processing, and may be specifically configured to obtain the raw image from the terminal 11, and segment the raw image to obtain a target foreground image region or a target background image region of the raw image. The target foreground image region may be a region that includes a target object. The target background image region may be a region that does not include the target object. The target object may be a person, a building, an animal, an article, or the like.

In some embodiments, the segmentation process of the raw image may be implemented by the terminal 11 or the server 10. In an example embodiment, the server 10 segments the raw image. For a process of segmenting the raw image by the terminal 11, refer to the process of segmenting the raw image by the server 10. Details are not described again.

The server 10 may be an independent physical server, or may be a server cluster or a distributed system formed by a plurality of physical servers, or may be a cloud server that provides basic cloud computing services such as a cloud service, a cloud database, cloud computing, a cloud function, cloud storage, a network service, cloud communication, a middleware service, a domain name service, a security service, a content delivery network (CDN), big data, and an AI platform. The terminal 11 may be, but is not limited to, a smart phone, a pad, a laptop, a desktop, a smart speaker, a smart watch, and the like. The terminal and the server may be directly or indirectly connected in a wired or wireless communication manner. However, this is not specifically limited herein.

Figure 2A:
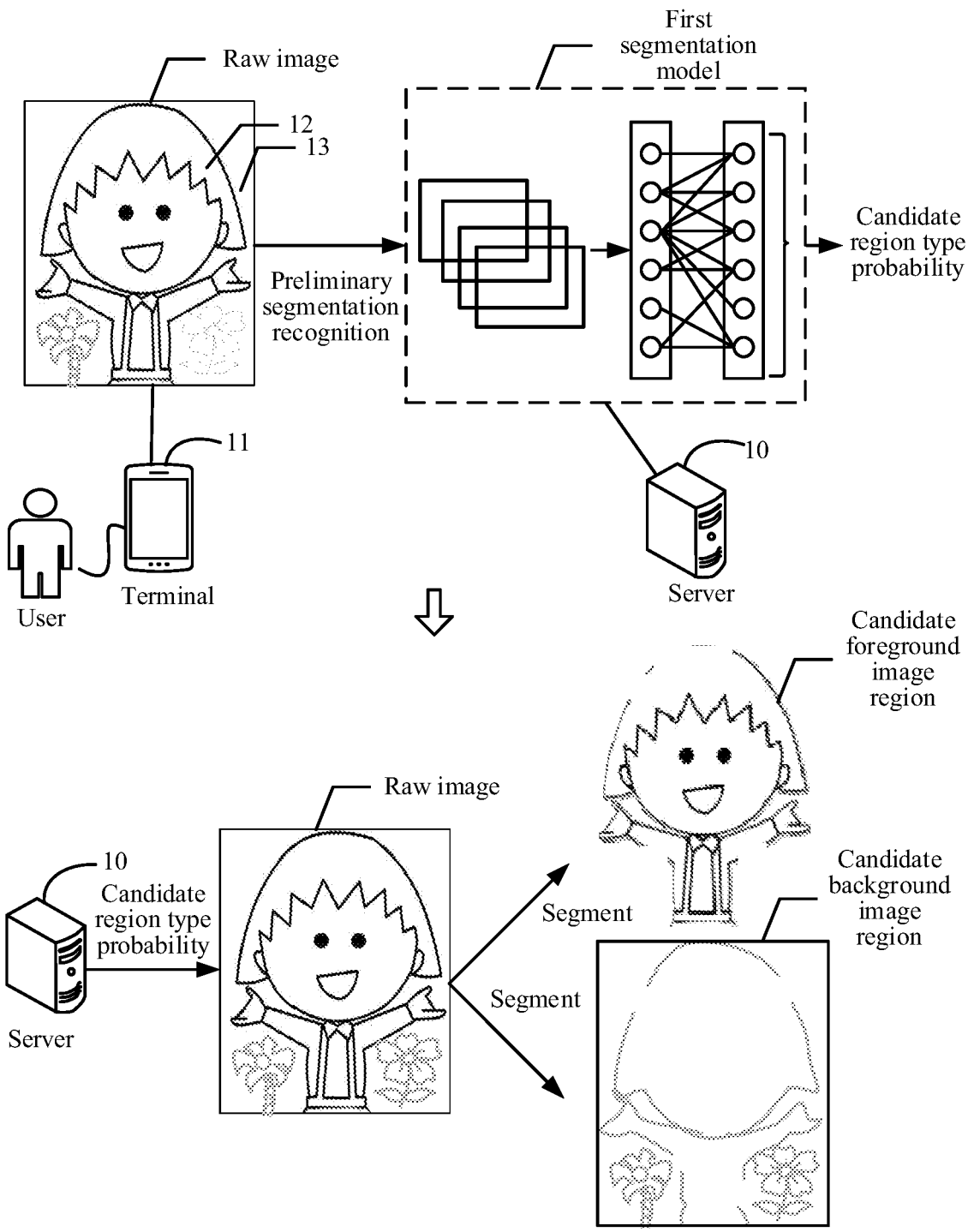
FIG. 2A is a schematic diagram of an interaction scenario between devices of an image processing system according some embodiments of the disclosure.

In an example embodiment, as shown in FIG. 2A, the terminal 11 may download an image from the network or capture an image, use the image as a raw image, and send the raw image to the server 10. For example, the raw image may be a person image. The raw image includes a foreground image region 12 and a background image region 13. The foreground image region 12 is a region that includes a person and the background image region 13 is a region behind the person. For example, as shown in FIG. 2A, the background image region 13 may include plants. Correspondingly, the server 10 may receive the raw image sent by the terminal 11, input the raw image into a first segmentation model, and perform preliminary segmentation recognition on the raw image to obtain a candidate region type probability of a pixel in the raw image. The preliminary segmentation recognition may be preliminary recognition of the raw image. The candidate region type probability is used for indicating a probability that the pixel in the raw image belongs to the background image region, that is, a candidate background probability. Alternatively, the candidate region type probability may be used for indicating a probability that the pixel in the raw image belongs to the foreground image region, that is, a candidate foreground probability. Alternatively, the candidate region type probability may include a candidate background probability and a candidate foreground probability.

Figure 2B:
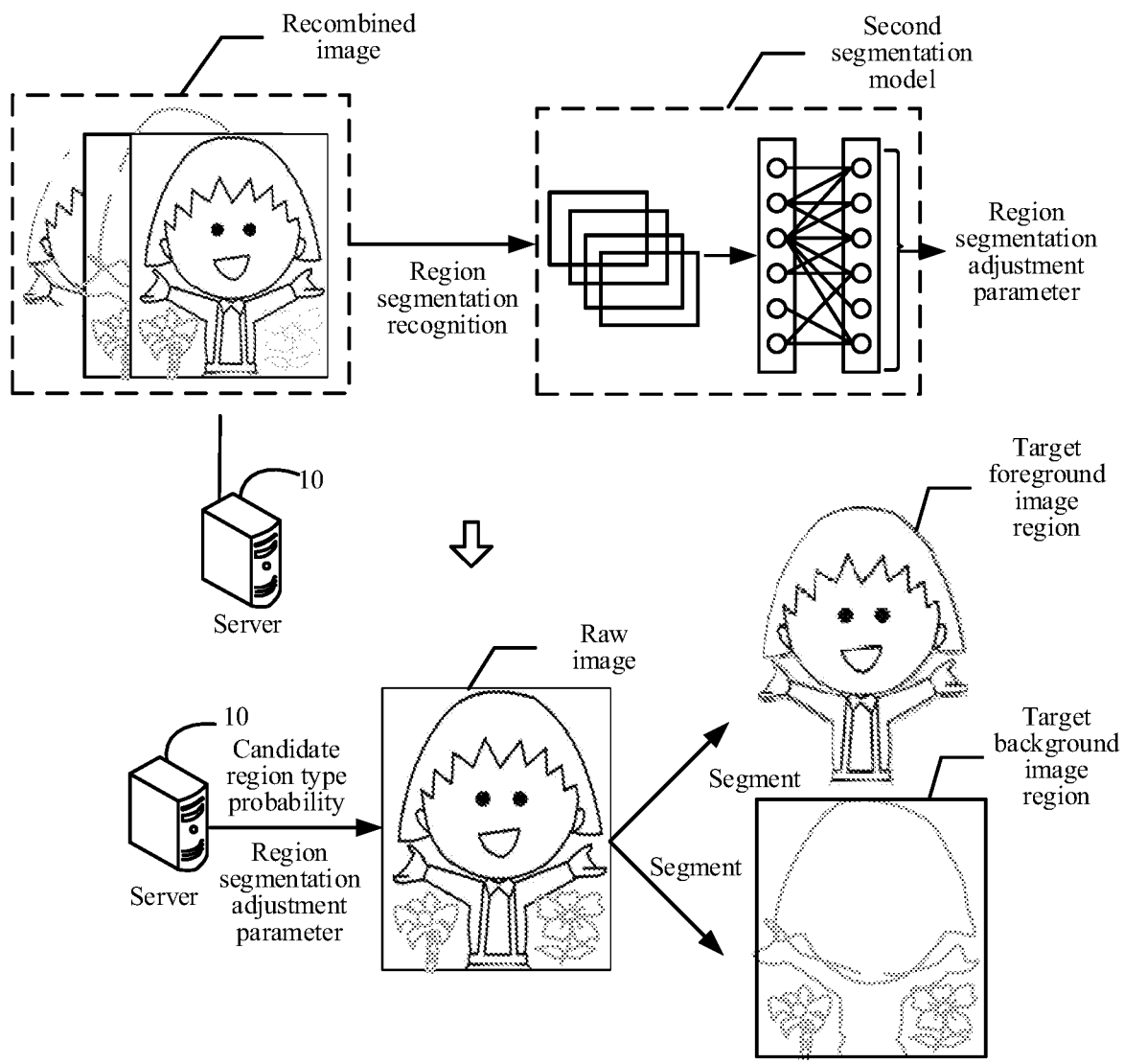
FIG. 2B is a schematic diagram of an interaction scenario between devices of an image processing system according some embodiments of the disclosure.

After obtaining the candidate region type probability, the server 10 may segment the raw image according to the candidate region type probability to obtain a candidate background image region and a candidate foreground image region of the raw image. As shown in FIG. 2A, some lines are missing in the candidate background image region and the candidate foreground image region, that is, there is a problem of information loss in the candidate foreground image region and the candidate background image region. In other words, accuracy of a segmentation result obtained by using the first segmentation model is relatively low. Therefore, the segmentation result of the first segmentation model needs to be optimized. As shown in FIG. 2B, the server 10 may recombine the raw image, the candidate background image region, and the candidate foreground image region to obtain a recombined image, and perform region segmentation recognition on the recombined image by using a second segmentation model to obtain a region segmentation adjustment parameter of a pixel in the recombined image. That is, the region segmentation adjustment parameter may be a parameter used for optimizing the segmentation result of the first segmentation model. Further, adjusted segmentation may be performed on the raw image according to the region segmentation adjustment parameter and the candidate region type probability to obtain a target foreground image region and a target background image region of the raw image. As can be learned by comparing the candidate background image region and the candidate foreground image region in FIG. 2A with the target background image region and the target foreground image region in FIG. 2B, a boundary between the target background image region and the target foreground image region is smoother and more precise.

In an example embodiment, preliminary segmentation is performed on the raw image by using the first segmentation model, and the segmentation result of the first segmentation model is optimized by using the second segmentation model, so that accuracy of image segmentation can be improved. In addition, the raw image, the candidate background image region, and the candidate foreground image region are recombined to provide more information for a region segmentation recognition process of the second segmentation model, so that a problem of information loss of the raw image during segmentation of the raw image is avoided, and the accuracy of image segmentation can be further improved.

Figure 3:
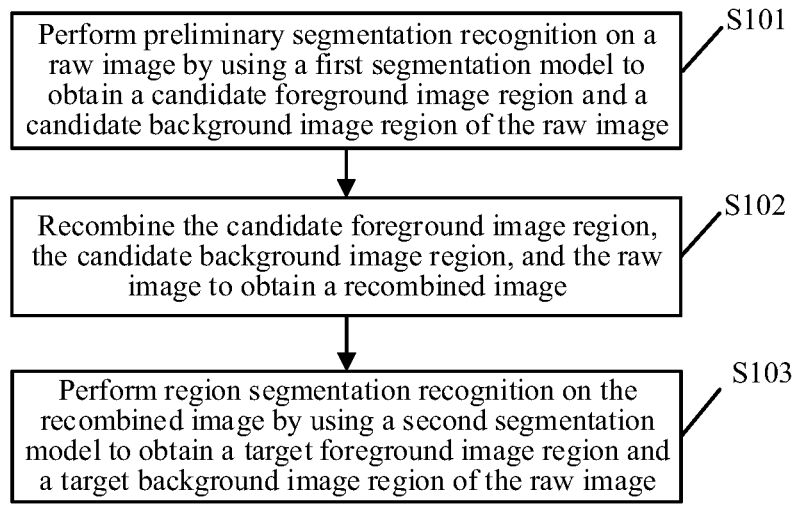
FIG. 3 is a schematic flowchart of an image processing method according to some embodiments of the disclosure.

FIG. 3 is a schematic flowchart of an image processing method according to some embodiments of the disclosure. The method may be performed by a computer device. The computer device may be the server 10 or the terminal 11 FIG. 1. As shown in FIG. 3, the image processing method may include the following operations S101 to S103.

S101. Perform preliminary segmentation recognition on a raw image by using a first segmentation model to obtain a candidate foreground image region and a candidate background image region of the raw image.

The foreground image region may be a region that includes a target object. The target object may be at least one of a person, a building, an article, a plant, an animal, and the like. That is, the target object may be an object that a user is interested in. The background image region may be a region where a person or a thing behind the target object is located. For example, the background image region is a region where an object that the user is not interested in is located.

After obtaining the raw image, the computer device may perform preliminary segmentation recognition on the raw image by using the first segmentation model to obtain the candidate foreground image region and the candidate background image region of the raw image. The first segmentation model may be a model used for performing preliminary segmentation recognition on the raw image. The candidate foreground image region and the candidate background image region may be obtained by performing preliminary segmentation on the raw image.

In some embodiments, operation S101 may include the following s01 and s02.

s01. Perform segmentation recognition on the raw image by using the first segmentation model to obtain a candidate region type probability of a pixel in the raw image.

s02. Segment the raw image according to the candidate region type probability to obtain the candidate foreground image region and the candidate background image region of the raw image.

In s01 and s02, after obtaining the raw image, the computer device may perform segmentation recognition on the raw image by using the first segmentation model to obtain the candidate region type probability of the pixel in the raw image. That is, the raw image is inputted into the first segmentation model to perform segmentation recognition on the raw image to obtain the candidate region type probability of the pixel in the raw image. After obtaining the candidate region type probability of the pixel in the raw image, the computer device may segment the raw image according to the candidate region type probability to obtain the candidate foreground image region and the candidate background image region of the raw image.

In some embodiments, the candidate region type probability includes a candidate foreground probability, the candidate foreground probability being used for reflecting a probability that the corresponding pixel in the raw image belongs to the foreground image region. The computer device may determine, in the raw image, a pixel whose candidate foreground probability is greater than a foreground probability threshold as a foreground pixel, and determine, in the raw image, a pixel whose candidate foreground probability is less than or equal to the foreground probability threshold as a background pixel. Further, a region belonging to the foreground pixel is obtained through segmentation from the raw image as the foreground image region, and a region belonging to the background pixel is obtained through segmentation from the raw image as the background image region.

In some embodiments, the candidate region type probability includes a candidate foreground probability. After obtaining the candidate foreground probability, the computer device may obtain a sum of candidate foreground probabilities of pixels in the raw image as a first probability value. A ratio of the candidate foreground probability of the pixel in the raw image to the first probability value is obtained. A pixel whose ratio is greater than a first foreground ratio threshold is determined as a foreground pixel. A pixel whose ratio is less than or equal to the first foreground ratio threshold in the raw image is determined as a background pixel. Further, a region belonging to the foreground pixel is obtained through segmentation from the raw image as the foreground image region, and a region belonging to the background pixel is obtained through segmentation from the raw image as the background image region. The ratio of the candidate foreground probability of the pixel in the raw image to the first probability value may be expressed by the following formula (1).

$$F_i = \frac{FG_i}{\sum_{k=0}^{K} FG_i} \quad (1)$$

In formula (1), $F_1$ represents a ratio of a candidate foreground probability of an $i^{th}$ pixel in the raw image to the first probability value, K represents a quantity of pixels in the raw image, and $FG_i$ represents the candidate foreground probability of the pixel in the raw image.

In some embodiments, the candidate region type probability includes a candidate background probability, the candidate background probability being used for reflecting a probability that the corresponding pixel in the raw image belongs to the background image region. The computer device may determine, in the raw image, a pixel whose candidate background probability is less than a background probability threshold as a foreground pixel, and determine, in the raw image, a pixel whose candidate background probability is greater than or equal to the background probability threshold as a background pixel. Further, a region belonging to the foreground pixel is obtained through segmentation from the raw image as the foreground image region, and a region belonging to the background pixel is obtained through segmentation from the raw image as the background image region.

In some embodiments, the candidate region type probability includes a candidate background probability. After obtaining the candidate background probability, the computer device may obtain a sum of candidate background probabilities of pixels in the raw image as a second probability value. A ratio of the candidate background probability of the pixel in the raw image to the second probability value is obtained. A pixel whose ratio is greater than a first background ratio threshold is determined as a background pixel. A pixel whose ratio is less than or equal to the first background ratio threshold in the raw image is determined as a foreground pixel. Further, a region belonging to the background pixel is obtained through segmentation from the raw image as the background image region, and a region belonging to the foreground pixel is obtained through segmentation from the raw image as the foreground image region.

In some embodiments, the candidate region type probability includes a candidate background probability and a candidate foreground probability. The computer device may select one of the candidate background probability and the candidate foreground probability, segment the raw image according to the selected probability to obtain the candidate foreground image region and the candidate background image region of the raw image.

S102. Recombine the candidate foreground image region, the candidate background image region, and the raw image to obtain a recombined image, pixels in the recombined image being in a one-to-one correspondence with pixels in the raw image.

During segmentation of the raw image, loss of boundary information between the candidate foreground image region and the candidate background image region is easily caused. Therefore, the computer device can recombine the candidate foreground image region, the candidate background image region, and the raw image to obtain the recombined image, that is, fuse the candidate foreground image region, the candidate background image region, and the raw image, and use an image obtained through fusion as the recombined image. The recombined image can provide more information than the raw image, that is, compensate for the boundary information lost during segmentation of the raw image, thereby helping improve accuracy of image segmentation. The recombined image has the same size as the raw image such that the pixels in the recombined image are in a one-to-one correspondence with the pixels in the raw image. Therefore, there is a correspondence between two pixels with the same position information in the raw image and the recombined image. For example, a coordinate system is established with a lower left corner of each of the raw image and the recombined image as a coordinate origin, and it is determined that there is a correspondence between two pixels with the same position coordinates in the raw image and the recombined image. For example, it is determined that there is a correspondence between a pixel with position coordinates of (1, 2) in the raw image and a pixel with position coordinates of (1, 2) in the recombined image.

S103. Perform region segmentation recognition on the recombined image by using a second segmentation model to obtain a target foreground image region and a target background image region of the raw image.

The computer device may optimize a segmentation result of the first segmentation model by using the second segmentation model to obtain the target background image region and the target foreground image region of the raw image. That is, the target background image region and the target background image region may be obtained by optimizing the candidate foreground image region and the candidate background image region.

In some embodiments, operation S103 may include the following s03 and s04.

s03. Perform region segmentation recognition on the recombined image by using the second segmentation model to obtain a region segmentation adjustment parameter of the pixel in the recombined image.

s04. Perform adjusted segmentation on the raw image according to the region segmentation adjustment parameter and the candidate region type probability to obtain the target foreground image region and the target background image region of the raw image.

In s03 and s04, the computer device may perform region segmentation recognition on the recombined image by using the second segmentation model to obtain the region segmentation adjustment parameter of the pixel in the recombined image, that is, input the recombined image into the second segmentation model to perform region segmentation recognition on the recombined image to obtain the region segmentation adjustment parameter of the pixel in the recombined image. The second segmentation model may be a model used for optimizing the segmentation result of the first segmentation model, or may be referred to as a fine segmentation model. The segmentation result herein may be the candidate region type probability. After obtaining the region segmentation adjustment parameter of the pixel in the recombined image, the computer device may perform adjusted segmentation on the raw image according to the region segmentation adjustment parameter and the candidate region type probability to obtain the target foreground image region and the target background image region of the raw image. That is, adjust the candidate background image region and the candidate foreground image region according to the region segmentation adjustment parameter and the candidate region type probability, use the adjusted candidate background image region as the target background image region of the raw image, and use the adjusted candidate foreground image region as the target foreground image region of the raw image.

The second segmentation model may be a depth refinement model, including a plurality of stacked modules with a depthwise separable convolution as a base structure. Considering complexity of the second segmentation model and accuracy of region segmentation recognition, the second segmentation model may include three stacked modules with the depthwise separable convolution as a base structure. A size of a feature map (the recombined image) of the second segmentation model in the region segmentation recognition process remains unchanged, thereby avoiding information loss of the recombined image due to adjustment of a size of the recombined image.

In some embodiments, preliminary segmentation recognition is performed on the raw image by using the first segmentation model to obtain the candidate region type probability of the pixel in the raw image, and the raw image is segmented according to the candidate region type probability to obtain the candidate background image region and the candidate background image region of the raw image. Further, the raw image, the candidate background image region, and the candidate background image region may be recombined to obtain the recombined image, so that boundary information lost during the preliminary segmentation of the raw image can be compensated, thereby helping provide rich information during optimized segmentation of the raw image. In this way, a boundary between the background image region and the foreground image region of the raw image is smoother and clearer, thereby improving accuracy of segmentation of the raw image. After obtaining the recombined image, the computer device may perform region segmentation recognition on the recombined image by using the second segmentation model to obtain the region segmentation adjustment parameter of the pixel in the recombined image, and may perform adjusted segmentation on the raw image according to the region segmentation adjustment parameter and the candidate region type probability to obtain the target foreground image region and the target background image region of the raw image. That is, segmentation prior information is provided for the second segmentation model by using the first segmentation model. The segmentation prior information herein may be the candidate region type probability, the candidate background image region, and the candidate foreground image region. The accuracy of image segmentation can be improved by optimizing the segmentation result of the first segmentation model by using the second segmentation model.

In some embodiments, the first segmentation model includes a feature extraction layer and a segmentation layer. Operation s01 may include the following operations s11 and s12.

s11. Perform feature extraction on the raw image by using the feature extraction layer to obtain structural feature information and semantic feature information of the pixel in the raw image.

s12. Perform segmentation recognition on the structural feature information and the semantic feature information by using the segmentation layer to obtain the candidate region type probability of the pixel in the raw image.

Figure 4:
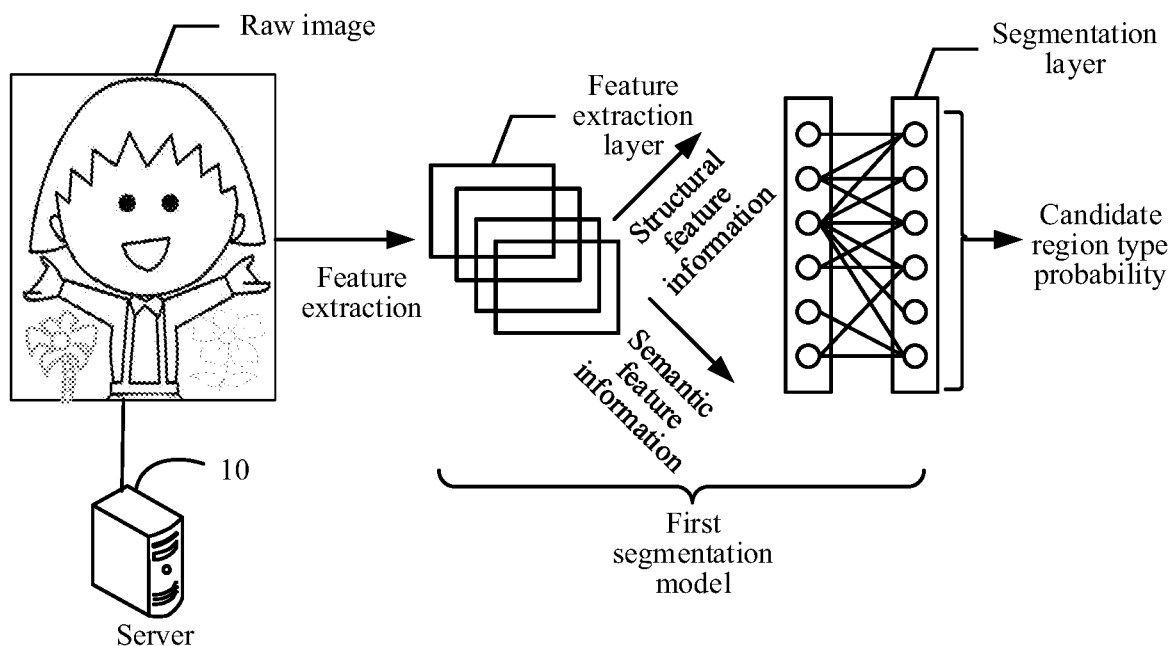
FIG. 4 is a schematic diagram of a scenario for obtaining a candidate region type probability according to some embodiments of the disclosure.

In s11 and s12, as shown in FIG. 4, the first segmentation model includes the feature extraction layer and the segmentation layer, the feature extraction layer may be used for extracting features of the raw image, and the segmentation layer may be used for performing candidate segmentation on the raw image. Specifically, feature extraction may be performed on the raw image by using the feature extraction layer to obtain the structural feature information and semantic feature information of the pixel in the raw image. The structural feature information may be shallow features of the raw image, and the structural feature information may be used for reflecting contour information (that is, texture information) in the raw image. The semantic feature information may be deep features of the raw image and the semantic feature information may be used for reflecting object information in the raw image, the object information including a type, a size, a color, and the like of an object. Further, the computer device may perform segmentation recognition on the structural feature information and the semantic feature information by using the segmentation layer to obtain the candidate region type probability of the pixel in the raw image. For example, the structural feature information and the semantic feature information are fused by using the segmentation layer, and segmentation recognition is performed on fused feature information to obtain the candidate region type probability of the pixel in the raw image.

The first segmentation model and the second segmentation model may each be a model constructed based on a convolutional neural network (CNN), for example, Visual Geometry Group Network (VGGNet, a convolutional neural network), ResNet (residual network), and AlexNet (a convolutional neural network); or may be a model constructed based on a fully convolutional network (FCN, a full neural network). However, this is not limited herein.

For example, the first segmentation model may be a semantic segmentation model with a depthwise separable convolution structure and a capability to recognize a foreground image region and a background image region. The first segmentation model may include a feature extraction layer and a segmentation recognition layer. The feature extraction layer may be an encoder. The segmentation recognition layer may be a decoder. The encoder may include stacked modules with the depthwise separable convolution as a based structure. The decoder may be of a deconvolution structure. Feature transfer of shallow features and deep features is performed between the encoder and the decoder through skip connections, so that the decoder can perform segmentation recognition on the semantic feature information in the shallow features and the structural feature information in the deep feature by fusing different features to obtain the candidate region type probability. Such an "encoder-decoder" network structure with the depthwise separable convolution as the base structure allows the first segmentation model to greatly reduce an amount of computation and parameters of the network while ensuring an image segmentation effect.

In some embodiments, operation S102 may include the following operations s21 to s24.

s21. Fuse the candidate background image region and the raw image to obtain a first fused image.

s22. Fuse the candidate foreground image region and the raw image to obtain a second fused image.

s23. Fuse the candidate foreground image region and the candidate background image region to obtain a third fused image.

s24. Fuse the raw image, the first fused image, the second fused image, and the third fused image to obtain the recombined image.

In s21 to s24, the computer device may recombine the candidate background image region, the candidate foreground image region, and the raw image. Specifically, the computer device may fuse the candidate background image region and the raw image to obtain the first fused image, that is, fuse the candidate background image region and the raw image according to a position of the candidate background image region in the raw image to obtain the first fused image. The candidate foreground image region and the raw image may be fused according to a position of the candidate foreground image region in the raw image to obtain the second fused image. The candidate foreground image region and the candidate background image region may be fused according to positions of the candidate foreground image region and the background image region in the raw image to obtain the third fused image. Then, the raw image, the first fused image, the second fused image, and the third fused image are fused to obtain the recombined image. The recombination of the candidate background image region, the candidate foreground image region, and the raw image can compensate for boundary information lost during the preliminary segmentation of the raw image, thereby helping provide rich information during optimized segmentation of the raw image. In this way, a boundary between the background image region and the foreground image region of the raw image is smoother and clearer, thereby improving accuracy of segmentation of the raw image.

In some embodiments, operation s04 may include the following operations s31 and s32.

s31. Adjust the candidate region type probability according to the region segmentation adjustment parameter to obtain a target region type probability.

s32. Perform adjusted segmentation on the raw image according to the target region type probability to obtain the target foreground image region and the target background image region of the raw image.

Figure 5:
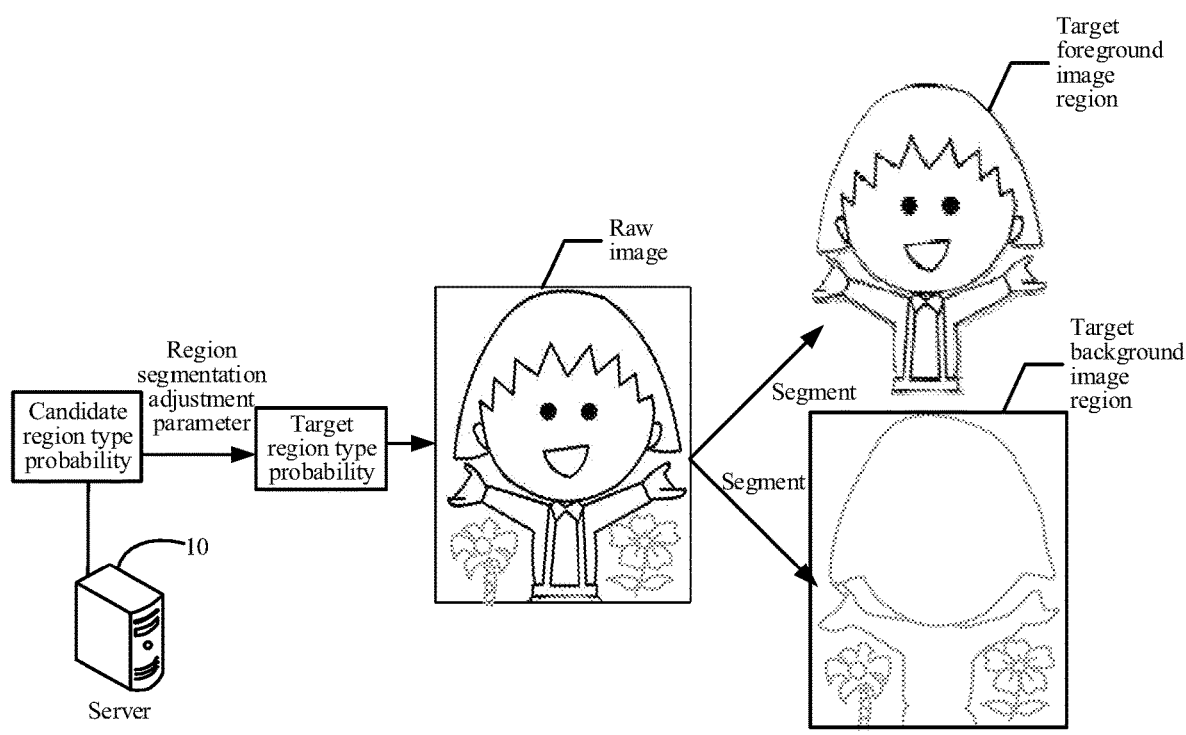
FIG. 5 is a schematic diagram of a scenario for performing segmentation adjustment on a raw image to obtain a target foreground image region and a target background image region of a raw image according to some embodiments of the disclosure.

In s31 and s32, the computer device may perform optimized segmentation on the raw image according to an output result of the second segmentation model to obtain the target foreground image region and the target background image region of the raw image. For example, as shown in FIG. 5, the computer device may adjust the candidate region type probability according to the region segmentation adjustment parameter to obtain the target region type probability. That is, the target region type probability is obtained by optimizing the candidate region type probability by using the second segmentation model. The accuracy of the target region type probability is higher. Therefore, adjusted segmentation may be performed on the raw image according to the target region type probability to obtain the target foreground image region and the target background image region of the raw image.

In some embodiments, the target region type probability includes a target foreground probability, the target foreground probability being used for reflecting a probability that the corresponding pixel in the raw image belongs to the foreground image region. The computer device may determine, in the raw image, a pixel whose target foreground probability is greater than a foreground probability threshold as a foreground pixel, and determine, in the raw image, a pixel whose target foreground probability is less than or equal to the foreground probability threshold as a background pixel. Further, a region belonging to the foreground pixel is obtained through segmentation from the raw image as the foreground image region, and a region belonging to the background pixel is obtained through segmentation from the raw image as the background image region.

In some embodiments, the target region type probability includes a target foreground probability. After obtaining the target foreground probability, the computer device may obtain a sum of target foreground probabilities of pixels in the raw image as a third probability value. A ratio of the target foreground probability of the pixel in the raw image to the third probability value is obtained. A pixel whose ratio is greater than a second foreground ratio threshold is determined as a foreground pixel. A pixel whose ratio is less than or equal to the second foreground ratio threshold in the raw image is determined as a background pixel. Further, a region belonging to the foreground pixel is obtained through segmentation from the raw image as the foreground image region, and a region belonging to the background pixel is obtained through segmentation from the raw image as the background image region.

In some embodiments, the target region type probability includes a target background probability, the target background probability being used for reflecting a probability that the corresponding pixel in the raw image belongs to the background image region. The computer device may determine, in the raw image, a pixel whose target background probability is less than a background probability threshold as a foreground pixel, and determine, in the raw image, a pixel whose target background probability is greater than or equal to the background probability threshold as a background pixel. Further, a region belonging to the foreground pixel is obtained through segmentation from the raw image as the foreground image region, and a region belonging to the background pixel is obtained through segmentation from the raw image as the background image region.

In some embodiments, the target region type probability includes a target background probability. After obtaining the target background probability, the computer device may obtain a sum of target background probabilities of pixels in the raw image as a fourth probability value. A ratio of the target background probability of the pixel in the raw image to the fourth probability value is obtained. A pixel whose ratio is greater than a second background ratio threshold is determined as a background pixel. A pixel whose ratio is less than or equal to the second background ratio threshold in the raw image is determined as a foreground pixel. Further, a region belonging to the background pixel is obtained through segmentation from the raw image as the background image region, and a region belonging to the foreground pixel is obtained through segmentation from the raw image as the foreground image region.

In some embodiments, the target region type probability includes a target background probability and a target foreground probability. The computer device may select one of the target background probability and the target foreground probability, and perform adjusted segmentation on the raw image according to the selected probability to obtain the target foreground image region and the target background image region of the raw image.

In this embodiment, the region segmentation adjustment parameter includes a foreground segmentation adjustment parameter, a background segmentation adjustment parameter, and an offset value. The candidate region type probability includes a candidate foreground probability and a candidate background probability. Operation s31 may include the following operations s41 to s43.

s41. Perform weighted summation on the candidate foreground probability and the candidate background probability by using the foreground segmentation adjustment parameter and the background segmentation adjustment parameter to obtain a probability sum.

s42. Generate a target foreground probability according to the probability sum and the offset value; and obtain a target background probability according to the target foreground probability.

s43. Determine the target region type probability according to the target foreground probability and the target background probability.

In s41 to s43, the region segmentation adjustment parameter includes the foreground segmentation adjustment parameter, the background segmentation adjustment parameter, and the offset value. The foreground segmentation adjustment parameter is used for reflecting accuracy (i.e., confidence) of the candidate foreground probability of the corresponding pixel in the raw image. A larger foreground segmentation adjustment parameter of the pixel indicates lower accuracy of the candidate foreground probability of the pixel and a greater adjustment of the candidate foreground probability of the pixel. A smaller foreground segmentation adjustment parameter of the pixel indicates higher accuracy of the candidate foreground probability of the pixel and a smaller adjustment of the candidate foreground probability of the pixel. Similarly, the background segmentation adjustment parameter is used for reflecting accuracy of the candidate background probability of the corresponding pixel in the raw image. A larger background segmentation adjustment parameter of the pixel indicates lower accuracy of the candidate background probability of the pixel and a greater adjustment of the candidate background probability of the pixel. A smaller background segmentation adjustment parameter of the pixel indicates higher accuracy of the candidate background probability of the pixel and a smaller adjustment of the candidate background probability of the pixel. The offset value may be an equilibrium parameter between the candidate background probability and the candidate foreground probability, and used for fine-tuning the candidate background probability and the candidate foreground probability. In an example embodiment, the computer device may perform weighted summation on the candidate foreground probability and the candidate background probability by using the foreground segmentation adjustment parameter and the background segmentation adjustment parameter to obtain the probability sum, that is, adjust the candidate foreground probability by using the foreground segmentation adjustment parameter, adjust the candidate background probability by using the background segmentation adjustment parameter, and determine a sum of the adjusted candidate foreground probability and the adjusted candidate background probability as the probability sum. Further, a target foreground probability may be generated according to the probability sum and the offset value. A target background probability is obtained according to the target foreground probability. The target foreground probability and the target background probability are determined as the target region type probability.

In some embodiments, the target region type probability may be expressed by the following formula (2).

$$Pred_i = a_i * FG_i + b_i * BG_i + c_i \qquad (2)$$

where $Pred_i$ in formula (2) represents a target foreground probability of an $i^{th}$ pixel in the raw image, and $a_i$, $b_i$, and $c_i$ respectively represent a foreground segmentation adjustment parameter, a background segmentation adjustment parameter, and an offset value of the $i^{th}$ pixel in the recombined image; and $FG_i$ and $BG_i$ respectively represent a candidate foreground probability and a candidate background probability of the $i^{th}$ pixel in the raw image. After the target foreground probability of the $i^{th}$ pixel in the raw image is obtained through calculation, $1-Pred_i$ may be used as a target background probability of the $i^{th}$ pixel in the raw image. The $i^{th}$ pixel of the recombined image corresponds to the $i^{th}$ pixel of the raw image, that is, position information of the $i^{th}$ pixel of the recombined image is the same as position information of the $i^{th}$ pixel of the raw image.

In an embodiment, the method may include the following operations s51 to s53.

s51. Obtain a background image.

s52. Adjust the background image according to the target background probability to obtain a background replacement region.

s53. Stitch the background replacement region and the target foreground region to obtain a raw image with a background replaced.

Figure 6:
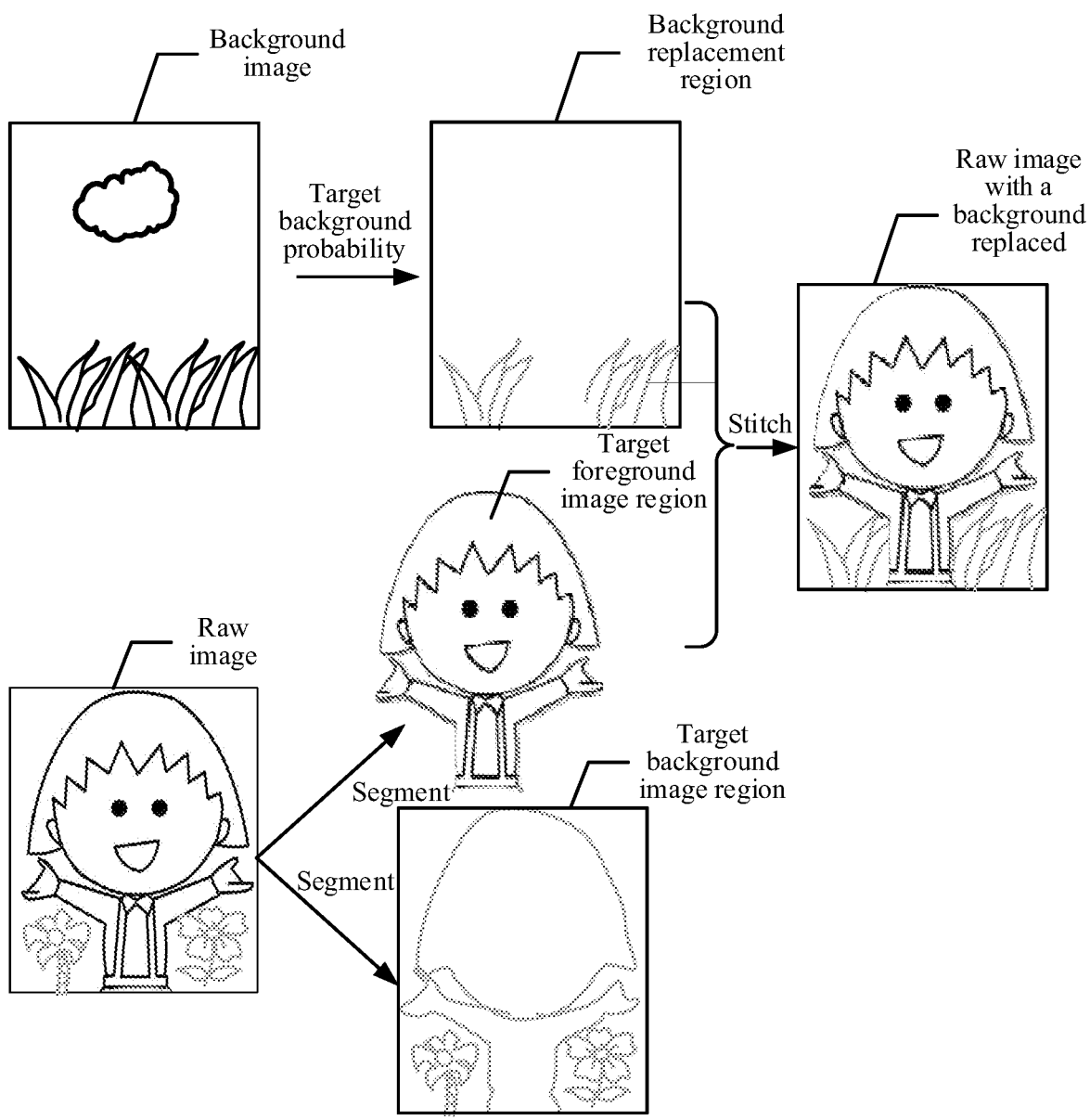
FIG. 6 is a schematic diagram of a scenario for performing segmentation adjustment on a raw image to obtain a target foreground image region and a target background image region of a raw image according to some embodiments of the disclosure.

In s51 to s53, after the target background image region and the target foreground image region of the raw image are recognized, a raw image background replacement operation is performed. Specifically, the computer device may obtain the background image. The background image may be used for replacing an image of the background image region of the raw image. As shown in FIG. 6, the background image includes grass and clouds. Pixels in the background image are in one-to-one correspondence with pixels in the raw image, such that there is a correspondence between pixels with the same position information in the background image and the raw image and a target background probability of a pixel in the raw image may be determined as a target background probability of a corresponding pixel in the background image. The computer device may adjust the background image according to the target background probability to obtain the background replacement region, that is, a pixel whose target background probability is greater than a background probability threshold in the background image is used as a background pixel, and a pixel whose target background probability is less than or equal to the background probability threshold in the background image is used as a foreground pixel. Color information of the background pixel in the background image may be adjusted according to color information of the target foreground image region (or a bokeh effect, such as transparency reduction may be performed on the background pixel in the background image), and foreground pixels in the background image are removed to obtain the background replacement region. The background replacement region and the target foreground region may be stitched to obtain the raw image with the background replaced. The background image is adjusted according to the target background probability to obtain the background replacement region, so that the background replacement region and the target foreground region can be better stitched, so a color and a size of the background replacement region better match a color and a size of the target foreground region, and the raw image with the background replaced is smoother and clearer. As shown in FIG. 6, a person in the raw image is still located in the foreground image region of the raw image with the background replaced, and the grass in the background image is located in the background image region of the raw image with the background replaced.

In some embodiments, the raw image with the background replaced may be expressed by the following formula (3).

$$Pred_{final} = Pred * RAW + (1 - Pred) * BACK \qquad (3)$$

where RAW may be the raw image, BACK may be the background image, $Pred_{final}$ represents the raw image with the background replaced, Pred*RAW represents the target foreground image region obtained by segmenting the raw image by using the target foreground probability of the raw image, and (1−Pred)*BACK represents the background replacement region obtained by segmenting (that is, adjusting) the background image by using the target background probability of the raw image; and Pred represents a target foreground probability matrix including target foreground probabilities of all pixels in the raw image.

In an embodiment, the method may further include the following operations s61 to s64.

s61. Obtain a first candidate segmentation model and a sample image set, the sample image set including a sample image and a labeled region type probability of a pixel in the sample image.

s62. Predict the sample image by using the first candidate segmentation model to obtain a prediction region type probability of the pixel in the sample image as a first prediction region type probability.

s63. Adjust the first candidate segmentation model according to the first prediction region type probability and the labeled region type probability.

s64. Determine the adjusted first candidate segmentation model as the first segmentation model.

In s61 to s64, the computer device may train the first candidate segmentation model to obtain the first segmentation model. Specifically, the first candidate segmentation model and the sample image set may be obtained, the sample image set including the sample image and the labeled region type probability of the pixel in the sample image. The sample image set may include sample images with various target objects, such as including a sample image with persons, a sample image with animals, and a sample image with buildings. The labeled region type probability of the pixel in the sample image may be obtained by manually labeling the sample image. Further, the sample image may be predicted by using the first candidate segmentation model to obtain the prediction region type probability of the pixel in the sample image as the first prediction region type probability. If the first prediction region type probability is relatively close to the labeled region type probability, it indicates that prediction accuracy of the first candidate segmentation model is relatively high. If a difference between the first prediction region type probability and the labeled region type probability is relatively large, it indicates that prediction accuracy of the first candidate segmentation model is relatively low. Therefore, the computer device may adjust the first candidate segmentation model according to the first prediction region type probability and the labeled region type probability, and determine the adjusted first candidate segmentation model as the first segmentation model. The adjustment of the first candidate segmentation model can improve image segmentation accuracy of the first candidate segmentation model.

In some embodiments, operation s63 may include the following operation s71 to s76.

s71. Determine an original loss value of the first candidate segmentation model according to the first prediction region type probability and the labeled region type probability.

s72. Obtain a change rate between first prediction region type probabilities of pixels in the sample image as a first gradient change rate.

s73. Obtain a change rate between labeled region type probabilities of pixels in the sample image as a second gradient change rate.

s74. Determine a boundary loss value of the first candidate segmentation model according to the first gradient change rate and the second gradient change rate.

s75. Determine a total loss value of the first candidate segmentation model according to the boundary loss value and the original loss value.

s76. Adjust the first candidate segmentation model according to the total loss value in a case that the total loss value does not meet a convergence condition.

Figure 7:
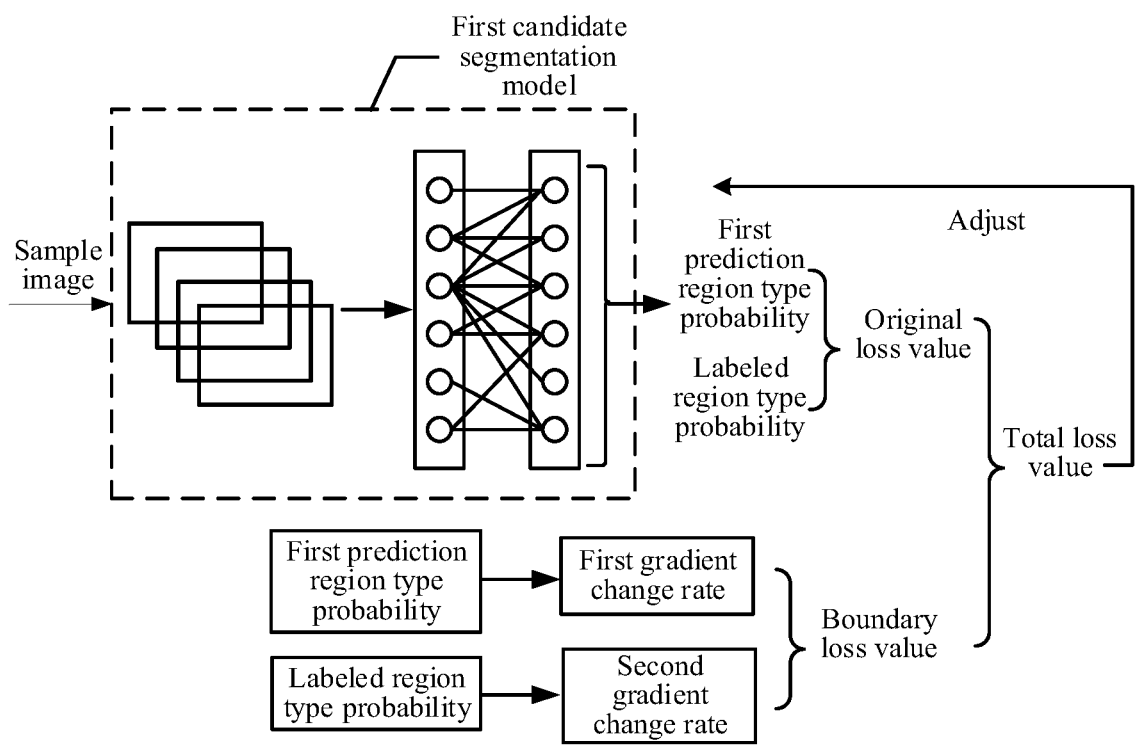
FIG. 7 is a schematic diagram of a scenario for adjusting a first candidate segmentation model to obtain a first segmentation model according to some embodiments of the disclosure.

In s71 to s76, as shown in FIG. 7, the computer device may determine the original loss value of the first candidate segmentation model according to the first prediction region type probability and the labeled region type probability, the original loss value being used for reflecting accuracy of the first prediction region type probability outputted by the first candidate segmentation model. Further, a change rate between first prediction region type probabilities of adjacent pixels in the sample image may be obtained as the first gradient change rate, and a change rate between labeled region type probabilities of the adjacent pixels in the sample image is obtained as the second gradient change rate. The first gradient change rate may be used for reflecting a speed of change between the first prediction region type probabilities. Usually, first prediction region type probabilities of pixels at a boundary between the foreground image region and the background image region of the sample image change slowly. Therefore, the first gradient change rate may be used for reflecting accuracy of segmentation recognition of the first candidate segmentation model for the pixels at the boundary between the foreground image region and the background image region in the sample image. Therefore, the boundary loss value of the first candidate segmentation model can be determined according to the first gradient change rate and the second gradient change rate, that is, the boundary loss value is used for reflecting boundary segmentation recognition accuracy of the first candidate segmentation model. Further, the total loss value of the first candidate segmentation model may be determined according to the boundary loss value and the original loss value. If the total loss value meets the convergence condition, it indicates that the boundary segmentation recognition accuracy of the first candidate segmentation model and accuracy of the outputted first prediction region type probability are relatively high, and the first candidate segmentation model may be used as the first segmentation model. If the total loss value does not meet the convergence condition, it indicates that the boundary segmentation recognition accuracy of the first candidate segmentation model and accuracy of the outputted first prediction region type probability are relatively low, and the first candidate segmentation model is adjusted according to the total loss value. The first candidate segmentation model is adjusted by using the boundary loss value and the original loss value to obtain the first segmentation model, so that accuracy and clarity of the first segmentation model for segmenting a boundary between a foreground image region and a background image region of an image are improved.

In some embodiments, the total loss value of the first candidate segmentation model may be expressed by the following formula (4).

$$L_1 = L_{ce} + L_{grad} \quad (4)$$

In formula (4), $L_1$ represents the total loss value of the first candidate segmentation model, $L_{ce}$ represents the original loss value of the first candidate segmentation model, and $L_{grad}$ represents the boundary loss value of the first candidate segmentation model, or may be referred to as a gradient loss value.

The original loss value $L_{ce}$ of the first candidate segmentation model may be expressed by the following formula (5).

$$L_{ce} = -\sum_{i=1}^{K} p_i \log q_i \quad (5)$$

In formula (5), $p_i$ represents a labeled region type probability of an $i^{th}$ pixel of the sample image, $q_i$ represents a prediction region type probability of the $i^{th}$ pixel of the sample image, and K represents a quantity of pixels in the sample image.

The boundary loss value $L_{grad}$ of the first candidate segmentation model may be expressed by the following formula (6).

$$L_{grad} = \frac{1}{K}\sum_{i=1}^{K}|G(q_i) - G(p_i)|^2 = \frac{1}{2K}\sum_{i=1}^{K}|(S*q_i - S*p_i) - (S^T*q_i - S^T*p_i)|^2 \quad (6)$$

In formula (6), $G(q_i)$ represents the first gradient change rate, that is, represents a gradient of the first prediction region type probability of the pixel in the sample image, $G(p_i)$ represents the second gradient change rate, that is, represents a gradient of the labeled region type probability of the pixel in the sample image, S and $S^T$ respectively represent gradient operators of the pixel in the sample image in x-axis and Y-axis directions, $S^T$ is the transpose of S, and S may be expressed by the following formula (7).

$$S = \begin{bmatrix} -1 & -2 & -1 \\ 0 & 0 & 0 \\ 1 & 2 & 1 \end{bmatrix} \quad (7)$$

In some embodiments, the method may further include the following operations s81 to s86.

s81. Obtain a second candidate segmentation model and a target prediction region type probability, the target prediction region type probability being a first prediction region type probability outputted in a case that the total loss value of the first candidate segmentation model is in a convergence state.

s82. Segment the sample image according to the target prediction region type probability to obtain a foreground image region and a background image region of the sample image.

s83. Recombine the sample image and the foreground image region and the background image region of the sample image to obtain a sample recombined image.

s84. Predict the sample recombined image by using the second candidate segmentation model to obtain a second prediction region type probability.

s85. Adjust the second candidate segmentation model according to the second prediction region type probability and the labeled region type probability.

s86. Determine the adjusted second candidate segmentation model as the second segmentation model.

Figure 8:
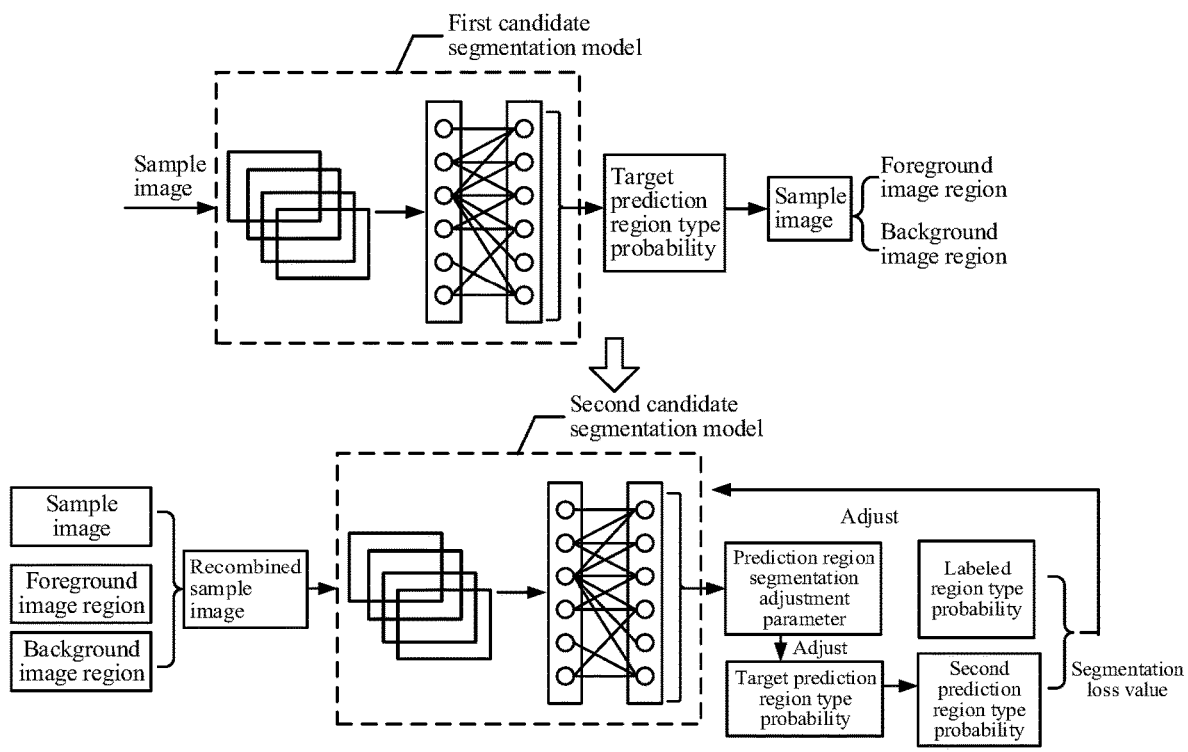
FIG. 8 is a schematic diagram of a scenario for adjusting a second candidate segmentation model to obtain a second segmentation model according to some embodiments of the disclosure.

In s81 to s86, as shown in FIG. 8, after training of the first candidate segmentation model is completed, the second candidate segmentation model may be trained according to the first candidate segmentation model. Specifically, the computer device may obtain the second candidate segmentation model and target prediction region type probability. The target prediction region type probability is a first prediction region type probability outputted in a case that the total loss value of the first candidate segmentation model is in the convergence state, that is, the target prediction region type probability is a first prediction region type probability outputted in a case that prediction accuracy of the first candidate segmentation model is relatively high. The sample image may be segmented according to the target prediction region type probability to obtain the foreground image region and the background image region of the sample image, and the sample image and the foreground image region and the background image region of the sample image are recombined to obtain the sample recombined image. The sample recombined image is predicted by using the second candidate segmentation model to obtain the second prediction region type probability. If the second prediction region type probability is relatively close to the labeled region type probability, it indicates that prediction accuracy of the second candidate segmentation model is relatively high. If a difference between the second prediction region type probability and the labeled region type probability is relatively large, it indicates that prediction accuracy of the second candidate segmentation model is relatively low. Therefore, the second candidate segmentation model is adjusted according to the second prediction region type probability and the labeled region type probability, and the adjustment of the second segmentation model can improve image segmentation accuracy of the second candidate segmentation model.

In some embodiments, operation s84 includes the following operations s88 and s89.

s88. Predict the sample recombined image by using the second candidate segmentation model to obtain a prediction region segmentation adjustment parameter of a pixel in the sample recombined image.

s89. Adjust the target prediction region type probability by using the prediction region segmentation adjustment parameter to obtain the second prediction region type probability.

In s88 and s89, the computer device may predict the sample recombined image by using the second candidate segmentation model to obtain the prediction region segmentation adjustment parameter of the pixel in the sample recombined image. The prediction region segmentation adjustment parameter is used for adjusting the target prediction region type probability outputted by the first candidate segmentation model. Then, the target prediction region type probability is adjusted by using the prediction region segmentation adjustment parameter to obtain the second prediction region type probability.

In some embodiments, operation s85 may include the following operations s91 and s92.

s91. Determine a segmentation loss value of the second candidate segmentation model according to the second prediction region type probability and the labeled region type probability.

s92. Adjust the second candidate segmentation model according to the segmentation loss value in a case that the segmentation loss value does not meet the convergence condition.

In s91 and s92, the computer device may determine the segmentation loss value of the second candidate segmentation model according to the second prediction region type probability and the labeled region type probability, the segmentation loss value being used for reflecting image segmentation accuracy of the second candidate segmentation model. Therefore, if the segmentation loss value meets the convergence condition, it indicates that the image segmentation accuracy of the second candidate segmentation model is relatively high, and the second candidate segmentation model is used as the second segmentation model. If the segmentation loss value does not meet the convergence condition, it indicates that the image segmentation accuracy of the second candidate segmentation model is relatively low, and the second candidate segmentation model is adjusted according to the segmentation loss value. The adjustment of the second candidate segmentation model can improve the image segmentation accuracy of the second candidate segmentation model.

In some embodiments, the segmentation loss value of the second candidate segmentation model may be expressed by the following formula (8).

$$L_2 = \frac{1}{K}\sum_{i=1}^{K}|w_i - p_i| \tag{8}$$

In formula (8), $w_i$ and $p_i$ respectively represent a second prediction region type probability and a labeled region type probability of an $i^{th}$ pixel in the sample image, and $L_2$ represents the segmentation loss value of the second candidate segmentation model.

Figure 9:
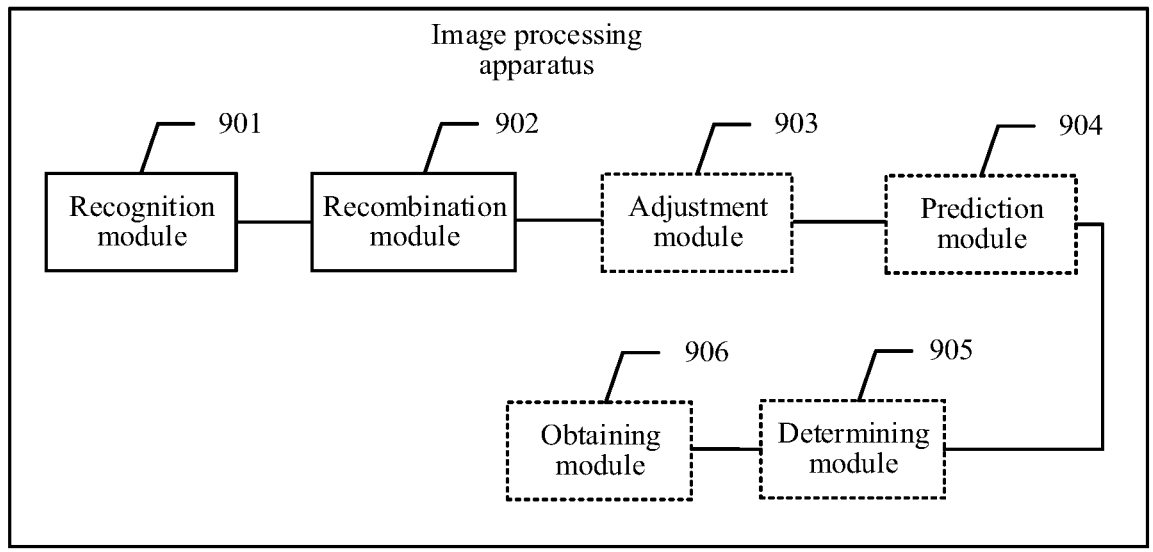
FIG. 9 is a schematic structural diagram of an image processing apparatus according to some embodiments of the disclosure.

FIG. 9 is a schematic structural diagram of an image processing apparatus according to some embodiments of the disclosure. The image processing apparatus may be a computer program (including program code) running in a computer device such as a terminal or server. For example, the image processing apparatus is application software. The apparatus may be configured to perform the corresponding operations in the method provided in the embodiments of the disclosure. As shown in FIG. 9, the image processing apparatus may include a recognition module 901 and a recombination module 902.

The recognition module 901 can be configured to perform preliminary segmentation recognition on a raw image by using a first segmentation model to obtain a candidate foreground image region and a candidate background image region of the raw image.

The recombination module 902 can be configured to recombine the candidate foreground image region, the candidate background image region, and the raw image to obtain a recombined image, pixels in the recombined image being in a one-to-one correspondence with pixels in the raw image.

The recognition module 901 may be further configured to perform region segmentation recognition on the recombined image by using a second segmentation model to obtain a target foreground image region and a target background image region of the raw image.

An example embodiment in which the recognition module 901 performs preliminary segmentation recognition on the raw image by using the first segmentation model to obtain the candidate foreground image region and the candidate background image region of the raw image may include:

performing segmentation recognition on the raw image by using the first segmentation model to obtain a candidate region type probability of a pixel in the raw image;

segmenting the raw image according to the candidate region type probability to obtain the candidate foreground image region and the candidate background image region of the raw image.

In some embodiments, the first segmentation model may include a feature extraction layer and a segmentation layer.

An example embodiment in which the recognition module 901 performs segmentation recognition on the raw image by using the first segmentation model to obtain the candidate region type probability of the pixel in the raw image may include:

performing feature extraction on the raw image by using the feature extraction layer to obtain structural feature information and semantic feature information of the pixel in the raw image; and performing segmentation recognition on the structural feature information and the semantic feature information by using the segmentation layer to obtain the candidate region type probability of the pixel in the raw image.

An example embodiment in which the recombination module 902 recombines the candidate foreground image region, the candidate background image region, and the raw image to obtain the recombined image may include:

fusing the candidate background image region and the raw image to obtain a first fused image;

fusing the candidate foreground image region and the raw image to obtain a second fused image;

fusing the candidate foreground image region and the candidate background image region to obtain a third fused image; and fusing the raw image, the first fused image, the second fused image, and the third fused image to obtain the recombined image.

An example embodiment in which the recognition module 901 performs region segmentation recognition on the recombined image by using the second segmentation model to obtain the target foreground image region and the target background image region of the raw image may include:

performing region segmentation recognition on the recombined image by using the second segmentation model to obtain a region segmentation adjustment parameter of the pixel in the recombined image; and performing adjusted segmentation on the raw image according to the region segmentation adjustment parameter and the candidate region type probability to obtain the target foreground image region and the target background image region of the raw image.

An example embodiment in which the recognition module 901 performs adjusted segmentation on the raw image according to the region segmentation adjustment parameter and the candidate region type probability to obtain the target foreground image region and the target background image region of the raw image may include:

adjusting the candidate region type probability according to the region segmentation adjustment parameter to obtain a target region type probability; and performing adjusted segmentation on the raw image according to the target region type probability to obtain the target foreground image region and the target background image region of the raw image.

In some embodiments, the region segmentation adjustment parameter may include a foreground segmentation adjustment parameter, a background segmentation adjustment parameter, and an offset value; and the candidate region type probability may include a candidate foreground probability and a candidate background probability.

An example embodiment in which the recognition module 901 adjusts the candidate region type probability according to the region segmentation adjustment parameter to obtain the target region type probability may include:

performing weighted summation on the candidate foreground probability and the candidate background probability by using the foreground segmentation adjustment parameter and the background segmentation adjustment parameter to obtain a probability sum;

generating a target foreground probability according to the probability sum and the offset value; and obtaining a target background probability according to the target foreground probability; and determining the target region type probability according to the target foreground probability and the target background probability.

In some embodiments, the apparatus further may further include: an obtaining module 906 configured to obtain a background image; and an adjustment module 903 configured to adjust the background image according to the target background probability to obtain a background replacement region; and stitch the background replacement region and the target foreground region to obtain a raw image with a background replaced.

In some embodiments, the obtaining module 906 may be further configured to obtain a first candidate segmentation model and a sample image set, the sample image set including a sample image and a labeled region type probability of a pixel in the sample image.

The apparatus may further include a prediction module 904 configured to predict the sample image by using the first candidate segmentation model to obtain a prediction region type probability of the pixel in the sample image as a first prediction region type probability.

In some embodiments, the adjustment module 903 may be further configured to adjust the first candidate segmentation model according to the first prediction region type probability and the labeled region type probability.

The apparatus may further include a determining module 905, configured to determine the adjusted first candidate segmentation model as the first segmentation model.

An example embodiment in which the adjustment module 903 adjusts the first candidate segmentation model according to the first prediction region type probability and the labeled region type probability may include:

determining an original loss value of the first candidate segmentation model according to the first prediction region type probability and the labeled region type probability;

obtaining a change rate between first prediction region type probabilities of pixels in the sample image as a first gradient change rate;

obtaining a change rate between labeled region type probabilities of pixels in the sample image as a second gradient change rate;

determining a boundary loss value of the first candidate segmentation model according to the first gradient change rate and the second gradient change rate;

determining a total loss value of the first candidate segmentation model according to the boundary loss value and the original loss value; and adjusting the first candidate segmentation model according to the total loss value in a case that the total loss value does not meet a convergence condition.

In some embodiments, the obtaining module 906 may be further configured to obtain a second candidate segmentation model and a target prediction region type probability, the target prediction region type probability being a first prediction region type probability outputted in a case that the total loss value of the first candidate segmentation model is in a convergence state.

The recognition module 901 may be further configured to segment the sample image according to the target prediction region type probability to obtain a foreground image region and a background image region of the sample image.

The recombination module 902 may be further configured to recombine the sample image and the foreground image region and the background image region of the sample image to obtain a sample recombined image.

The prediction module 904 may be further configured to predict the sample recombined image by using the second candidate segmentation model to obtain a second prediction region type probability.

The adjustment module 903 may be further configured to adjust the second candidate segmentation model according to the second prediction region type probability and the labeled region type probability.

The determining module 905 may be further configured to determine the adjusted second candidate segmentation model as the second segmentation model.

An example embodiment in which the prediction module 904 predicts the sample recombined image by using the second candidate segmentation model to obtain the second prediction region type probability may include:

predicting the sample recombined image by using the second candidate segmentation model to obtain a prediction region segmentation adjustment parameter of a pixel in the sample recombined image; and adjusting the target prediction region type probability by using the prediction region segmentation adjustment parameter to obtain the second prediction region type probability.

An example embodiment in which the adjustment module 903 adjusts the second candidate segmentation model according to the second prediction region type probability and the labeled region type probability may include:

determining a segmentation loss value of the second candidate segmentation model according to the second prediction region type probability and the labeled region type probability; and adjusting the second candidate segmentation model according to the segmentation loss value in a case that the segmentation loss value does not meet the convergence condition.

According to an embodiment of the disclosure, the operations in the image processing method shown in FIG. 3 may be performed by the modules of the image processing apparatus shown in FIG. 9. For example, operations S101 and S103 shown in FIG. 3 may be performed by the recognition module 901 in FIG. 9, and operation S102 shown in FIG. 3 may be performed by the recombination module 902 in FIG. 9.

According to another embodiment of the disclosure, the modules of the image processing apparatus shown in FIG. 9 may be separately or wholly combined into one or several units or code, or one (or more) of the units or code may further be divided into a plurality of subunits or subcode of smaller functions. In this way, same operations may be implemented, and the implementation of the technical effects of the embodiments is not affected. The foregoing modules are divided based on logical functions. A function of one module may also be implemented by a plurality of units or code, or functions of a plurality of modules are implemented by one unit or code. In other embodiments, the image processing apparatus may also include other units. Additionally, the functions may also be cooperatively implemented by other units and may be cooperatively implemented by a plurality of units.

According to an embodiment of the disclosure, a computer program (including program code) that can perform the operations in the corresponding methods shown in FIG. 3 and FIG. 7 may be run on a general computing device, such as a computer, which include processing elements and storage elements such as a central processing unit (CPU), a random access memory (RAM), and a read-only memory (ROM), to construct the image processing apparatus shown in FIG. 9, and implement the image processing method in the embodiments. The computer program may be recorded in, for example, a computer readable recording medium, and may be loaded into the foregoing computing device by using the computer readable recording medium, and run on the computing device.

Figure 10:
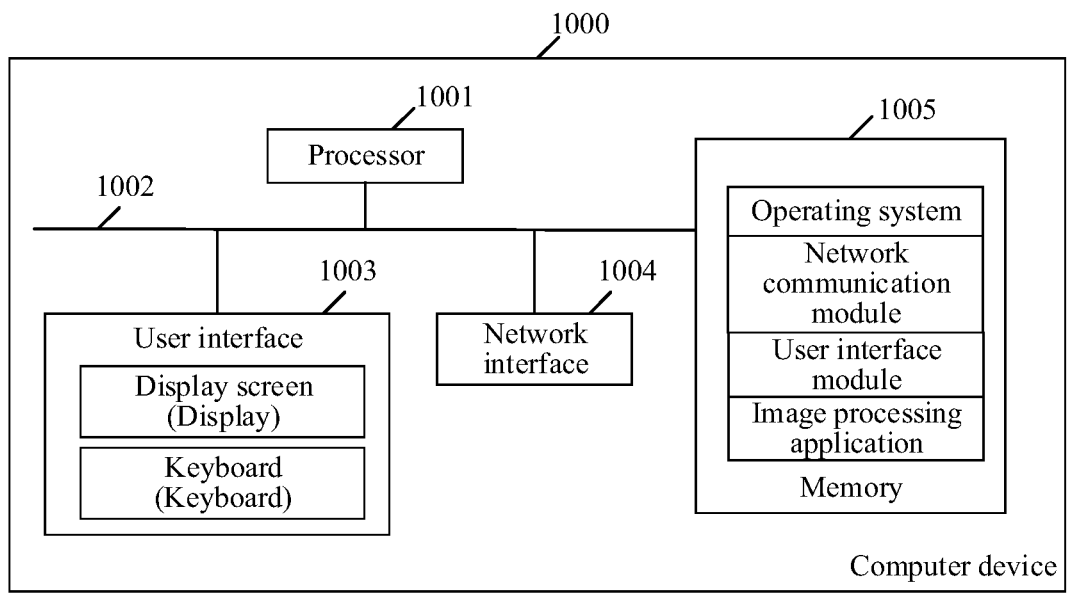
FIG. 10 is a schematic structural diagram of a computer device according to some embodiments of the disclosure.

FIG. 10 is a schematic structural diagram of a computer device according to an embodiment. As shown in FIG. 10, the computer device 1000 may include: a processor 1001, a network interface 1004, and a memory 1005. In addition, the computer device 1000 may further include a user interface 1003 and at least one communication bus 1002. The communication bus 1002 is configured to implement connection and communication between these components. The user interface 1003 may include a display and a keyboard. The user interface 1003 may further include a standard wired interface and a standard wireless interface. The network interface 1004 may include a standard wired interface and a standard wireless interface (such as a Wi-Fi interface). The memory 1005 may be a high-speed RAM, or may be a non-volatile memory, for example, at least one magnetic disk memory. The memory 1005 may alternatively be at least one storage apparatus located away from the processor 1001. As shown in FIG. 10, as a computer-readable storage medium, the memory 1005 may include an operating system, a network communication module, a user interface module, and an image processing application.

In the computer device 1000 shown in FIG. 10, the network interface 1004 can provide a network communication function; the user interface 1003 is mainly configured to provide a user with an interface for input; and the processor 1001 can be configured to call the image processing application stored in the memory 1005 to implement the image processing method described in the embodiments.

It is to be understood that, the computer device 1000 described may implement the descriptions of the image processing method in the embodiments corresponding to FIG. 3, or the descriptions of the image processing apparatus in the embodiment corresponding to FIG. 9. Details are not described herein again. In addition, the description of beneficial effects of the same method is not described herein again.

In addition, an embodiment of the disclosure may further provide a non-transitory computer-readable storage medium. The computer storage medium stores a computer program code executed by the image processing apparatus mentioned above, and the computer program code includes program instructions. When executing the program instructions, the processor can implement the descriptions of the image processing method in the embodiments corresponding to FIG. 3. Therefore, details are not described herein again. In addition, the description of beneficial effects of the same method is not described herein again. For technical details that are not disclosed in the computer-readable storage medium embodiments, refer to the descriptions of the method embodiments.

In an example, the foregoing program instruction may be deployed to be executed on a computer device, or deployed to be executed on a plurality of computer devices at the same location, or deployed to be executed on a plurality of computer devices that are distributed in a plurality of locations and interconnected through a communication network. The plurality of computer devices that are distributed in the plurality of locations and interconnected through the communication network may form a blockchain network.

A person skilled in the art may understand that all or some of the procedures of the methods of the foregoing embodiments may be implemented by a computer-readable instructions instructing relevant hardware. The computer-readable instructions may be stored in a non-volatile computer-readable storage medium. When the computer-readable instructions are executed, the procedures of the foregoing method embodiments may be implemented. The foregoing storage medium may include a magnetic disk, an optical disk, a read-only memory (ROM), a random access memory (RAM), or the like.

The image processing method and apparatus, the device, and the computer-readable storage medium provided in the embodiments are described above in detail. Although the principles and implementations of the disclosure are described by using specific examples in the specification, the foregoing descriptions of the embodiments are only intended to help understand the method and core idea of the disclosure. In addition, a person skilled in the art can make variations in terms of the specific implementations and application scopes according to the ideas of the disclosure. Therefore, the content of this specification shall not be construed as a limitation to the disclosure.

What is claimed is:

1. An image processing method, performed by at least one processor, the method comprising:
    performing preliminary segmentation recognition on a raw image by using a first segmentation model to obtain a candidate foreground image region and a candidate background image region of the raw image;
    recombining the candidate foreground image region, the candidate background image region, and the raw image to obtain a recombined image, pixels in the recombined image being in a one-to-one correspondence with pixels in the raw image; and
    performing region segmentation recognition on the recombined image by using a second segmentation model to obtain a target foreground image region and a target background image region of the raw image,
    wherein the performing region segmentation recognition on the recombined image by using a second segmentation model to obtain a target foreground image region and a target background image region of the raw image comprises:
        performing region segmentation recognition on the recombined image by using the second segmentation model to obtain a region segmentation adjustment parameter of the pixel in the recombined image; and
        performing adjusted segmentation on the raw image according to the region segmentation adjustment parameter and the candidate region type probability to obtain the target foreground image region and the target background image region of the raw image.

2. The image processing method according to claim 1, wherein the performing preliminary segmentation recognition comprises:
    performing segmentation recognition on the raw image by using the first segmentation model to obtain a candidate region type probability of a pixel in the raw image, the candidate region type probability being used for indicating a probability that the pixel in the raw image belongs to a foreground image region and/or a probability that the pixel in the raw image belongs to a background image region; and
    segmenting the raw image according to the candidate region type probability to obtain the candidate foreground image region and the candidate background image region of the raw image.

3. The image processing method according to claim 2, wherein the first segmentation model comprises a feature extraction layer and a segmentation layer, and the performing segmentation recognition on the raw image by using the first segmentation model to obtain a candidate region type probability of a pixel in the raw image comprises:
    performing feature extraction on the raw image by using the feature extraction layer to obtain structural feature information and semantic feature information of the pixel in the raw image; and
    performing segmentation recognition on the structural feature information and the semantic feature information by using the segmentation layer to obtain the candidate region type probability of the pixel in the raw image.

4. The image processing method according to claim 1, wherein the recombining comprises:
    fusing the candidate background image region and the raw image to obtain a first fused image;
    fusing the candidate foreground image region and the raw image to obtain a second fused image;
    fusing the candidate foreground image region and the candidate background image region to obtain a third fused image; and
    fusing the raw image, the first fused image, the second fused image, and the third fused image to obtain the recombined image.

5. The image processing method according to claim 1, wherein the performing adjusted segmentation comprises:
    adjusting the candidate region type probability according to the region segmentation adjustment parameter to obtain a target region type probability; and
    performing adjusted segmentation on the raw image according to the target region type probability to obtain the target foreground image region and the target background image region of the raw image.

6. The image processing method according to claim 5, wherein the region segmentation adjustment parameter comprises a foreground segmentation adjustment parameter, a background segmentation adjustment parameter, and an offset value; and the candidate region type probability comprises a candidate foreground probability and a candidate background probability; and the adjusting the candidate region type probability according to the region segmentation adjustment parameter to obtain a target region type probability comprises:

performing weighted summation on the candidate foreground probability and the candidate background probability by using the foreground segmentation adjustment parameter and the background segmentation adjustment parameter to obtain a probability sum;

generating a target foreground probability according to the probability sum and the offset value; and obtaining a target background probability according to the target foreground probability; and determining the target region type probability according to the target foreground probability and the target background probability.

7. The image processing method according to claim 6, further comprising:

obtaining a background image; the background image being used for replacing the background image region in the raw image;

adjusting the background image according to the target background probability to obtain a background replacement region; and stitching the background replacement region and the target foreground region to obtain a raw image with a background replaced.

8. The image processing method according to claim 7, further comprising:

obtaining a first candidate segmentation model and a sample image set, the sample image set comprising a sample image and a labeled region type probability of a pixel in the sample image;

predicting the sample image by using the first candidate segmentation model to obtain a prediction region type probability of the pixel in the sample image as a first prediction region type probability;

adjusting the first candidate segmentation model according to the first prediction region type probability and the labeled region type probability; and determining the adjusted first candidate segmentation model as the first segmentation model.

9. The image processing method according to claim 8, wherein the adjusting the first candidate segmentation model according to the first prediction region type probability and the labeled region type probability comprises:

determining an original loss value of the first candidate segmentation model according to the first prediction region type probability and the labeled region type probability;

obtaining a change rate between first prediction region type probabilities of pixels in the sample image as a first gradient change rate;

obtaining a change rate between labeled region type probabilities of pixels in the sample image as a second gradient change rate;

determining a boundary loss value of the first candidate segmentation model according to the first gradient change rate and the second gradient change rate;

determining a total loss value of the first candidate segmentation model according to the boundary loss value and the original loss value; and adjusting the first candidate segmentation model according to the total loss value in a case that the total loss value does not meet a convergence condition.

10. The image processing method according to claim 9, further comprising:

obtaining a second candidate segmentation model and a target prediction region type probability, the target prediction region type probability being a first prediction region type probability outputted in a case that the total loss value of the first candidate segmentation model is in a convergence state;

segmenting the sample image according to the target prediction region type probability to obtain a foreground image region and a background image region of the sample image;

recombining the sample image and the foreground image region and the background image region of the sample image to obtain a sample recombined image;

predicting the sample recombined image by using the second candidate segmentation model to obtain a second prediction region type probability;

adjusting the second candidate segmentation model according to the second prediction region type probability and the labeled region type probability; and determining the adjusted second candidate segmentation model as the second segmentation model.

11. The image processing method according to claim 10, wherein the predicting the sample recombined image by using the second candidate segmentation model to obtain a second prediction region type probability comprises:

predicting the sample recombined image by using the second candidate segmentation model to obtain a prediction region segmentation adjustment parameter of a pixel in the sample recombined image; and adjusting the target prediction region type probability by using the prediction region segmentation adjustment parameter to obtain the second prediction region type probability.

12. The image processing method according to claim 10, wherein the adjusting the second candidate segmentation model according to the second prediction region type probability and the labeled region type probability comprises:

determining a segmentation loss value of the second candidate segmentation model according to the second prediction region type probability and the labeled region type probability; and adjusting the second candidate segmentation model according to the segmentation loss value in a case that the segmentation loss value does not meet the convergence condition.

13. An image processing apparatus, comprising:

at least one memory configured to store program code; and at least one processor configured to read the program code and operate as instructed by the program code, the program code comprising:

recognition code configured to cause the at least one processor to perform preliminary segmentation recognition on a raw image by using a first segmentation model to obtain a candidate foreground image region and a candidate background image region of the raw image; and recombination code configured to cause the at least one processor to recombine the candidate foreground image region, the candidate background image region, and the raw image to obtain a recombined image, pixels in the recombined image being in a one-to-one correspondence with pixels in the raw image, and the recognition code being further configured to cause the at least one processor to:

perform region segmentation recognition on the recombined image by using a second segmentation model to obtain a region segmentation adjustment parameter of the pixel in the recombined image; and perform adjusted segmentation on the raw image according to the region segmentation adjustment parameter and the candidate region type probability to obtain a target foreground image region and a target background image region of the raw image.

14. The image processing apparatus according to claim 13, wherein the recognition code is further configured to cause the at least one processor to:

perform segmentation recognition on the raw image by using the first segmentation model to obtain a candidate region type probability of a pixel in the raw image, the candidate region type probability being used for indicating a probability that the pixel in the raw image belongs to a foreground image region and/or a probability that the pixel in the raw image belongs to a background image region; and segment the raw image according to the candidate region type probability to obtain the candidate foreground image region and the candidate background image region of the raw image.

15. The image processing apparatus according to claim 14, wherein the first segmentation model comprises a feature extraction layer and a segmentation layer, and the perform segmentation recognition on the raw image by using the first segmentation model to obtain a candidate region type probability of a pixel in the raw image comprises:

performing feature extraction on the raw image by using the feature extraction layer to obtain structural feature information and semantic feature information of the pixel in the raw image; and performing segmentation recognition on the structural feature information and the semantic feature information by using the segmentation layer to obtain the candidate region type probability of the pixel in the raw image.

16. The image processing apparatus according to claim 13, wherein the recombination code is further configured to cause the at least one processor to:

fuse the candidate background image region and the raw image to obtain a first fused image;

fuse the candidate foreground image region and the raw image to obtain a second fused image;

fuse the candidate foreground image region and the candidate background image region to obtain a third fused image; and fuse the raw image, the first fused image, the second fused image, and the third fused image to obtain the recombined image.

17. The image processing apparatus according to claim 13, wherein the perform adjusted segmentation comprises:

adjusting the candidate region type probability according to the region segmentation adjustment parameter to obtain a target region type probability; and performing adjusted segmentation on the raw image according to the target region type probability to obtain the target foreground image region and the target background image region of the raw image.

18. A non-transitory computer-readable storage medium, storing computer program code that when executed by at least one processor causes the at least one processor to:

perform preliminary segmentation recognition on a raw image by using a first segmentation model to obtain a candidate foreground image region and a candidate background image region of the raw image;

recombine the candidate foreground image region, the candidate background image region, and the raw image to obtain a recombined image, pixels in the recombined image being in a one-to-one correspondence with pixels in the raw image; and perform region segmentation recognition on the recombined image by using a second segmentation model to obtain a target foreground image region and a target background image region of the raw image, wherein the perform region segmentation recognition on the recombined image by using a second segmentation model to obtain a target foreground image region and a target background image region of the raw image comprises:

performing region segmentation recognition on the recombined image by using the second segmentation model to obtain a region segmentation adjustment parameter of the pixel in the recombined image; and performing adjusted segmentation on the raw image according to the region segmentation adjustment parameter and the candidate region type probability to obtain the target foreground image region and the target background image region of the raw image.

* * * * *